(12) United States Patent
Alcott et al.

(10) Patent No.: US 9,274,921 B2
(45) Date of Patent: Mar. 1, 2016

(54) SYSTEM AND METHOD FOR MANAGING CODE DISPLACEMENT

(75) Inventors: Thomas J. Alcott, Huntington Beach, CA (US); Kulvir Singh Bhogal, Forth Worth, TX (US); Jason Robert McGee, Apex, NC (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 11/616,400

(22) Filed: Dec. 27, 2006

(65) Prior Publication Data

US 2008/0163169 A1 Jul. 3, 2008

(51) Int. Cl.
*G06F 11/34* (2006.01)
*G06F 9/50* (2006.01)

(52) U.S. Cl.
CPC ........ *G06F 11/3433* (2013.01); *G06F 11/3466* (2013.01); *G06F 9/5038* (2013.01); *G06F 11/3409* (2013.01); *G06F 2201/81* (2013.01); *G06F 2201/865* (2013.01)

(58) Field of Classification Search
CPC ................................................ G06F 2009/4557
USPC ................... 717/120–121; 709/226
See application file for complete search history.

(56) References Cited

U.S. PATENT DOCUMENTS

| | | | |
|---|---|---|---|
| 5,717,900 A | 2/1998 | Whittaker | |
| 5,742,823 A * | 4/1998 | Edwards et al. | 718/102 |
| 6,055,363 A * | 4/2000 | Beals et al. | 709/201 |
| 6,093,215 A * | 7/2000 | Buxton et al. | 717/107 |
| 6,523,172 B1 * | 2/2003 | Martinez-Guerra et al. | 717/143 |
| 6,601,233 B1 * | 7/2003 | Underwood | 717/102 |
| 6,735,769 B1 * | 5/2004 | Brenner | G06F 9/3836 711/133 |
| 6,851,104 B1 * | 2/2005 | Rodrigues da Silva | 717/104 |
| 7,203,944 B1 * | 4/2007 | van Rietschote | G06F 9/45533 718/1 |
| 7,475,396 B2 * | 1/2009 | Kapoor | 717/178 |
| 7,702,497 B2 * | 4/2010 | Dombrowski et al. | 703/22 |
| 2002/0104067 A1 * | 8/2002 | Green et al. | 717/101 |
| 2003/0055878 A1 * | 3/2003 | Fletcher | G06F 9/465 709/203 |
| 2003/0149904 A1 * | 8/2003 | Kim | 713/330 |
| 2003/0172370 A1 * | 9/2003 | Satuloori et al. | 717/120 |
| 2004/0163014 A1 * | 8/2004 | Correa | 714/35 |
| 2004/0168153 A1 * | 8/2004 | Marvin | 717/120 |
| 2005/0005261 A1 * | 1/2005 | Severin | 717/108 |
| 2005/0229174 A1 * | 10/2005 | Westendorf et al. | 717/175 |
| 2006/0123410 A1 * | 6/2006 | Kapoor | 717/174 |
| 2006/0129516 A1 * | 6/2006 | Bradford et al. | 707/1 |
| 2006/0161884 A1 * | 7/2006 | Lubrecht et al. | 717/104 |
| 2006/0277539 A1 * | 12/2006 | Amarasinghe et al. | 717/168 |

(Continued)

OTHER PUBLICATIONS

Llosa, Joseph, et al., Reduced Code Size Modulo Scheduling in the Absence of Hardware Support, IEEE, 2002, pp. 99-110.

(Continued)

*Primary Examiner* — Matthew Brophy
(74) *Attorney, Agent, or Firm* — Charles L. Moore; Moore & Van Allen PLLC (57) ABSTRACT

A system for managing code displacement may include a manager and an application operable on a server. The application may include a plurality of modules each module for performing a different operation. The system may also include priority information associated with each module to permit the manager to deactivate selected ones of the modules based on the priority information to improve performance of the application.

23 Claims, 6 Drawing Sheets

(56) References Cited

U.S. PATENT DOCUMENTS

| | | | |
|---|---|---|---|
| 2007/0061799 A1* | 3/2007 | Kimmerly | 717/168 |
| 2007/0094396 A1* | 4/2007 | Takano | H04L 67/1008 709/226 |
| 2007/0157185 A1* | 7/2007 | Semerdzhiev et al. | 717/148 |
| 2007/0168961 A1* | 7/2007 | Ammerlaan et al. | 717/120 |
| 2007/0233969 A1* | 10/2007 | Shukla | G06F 9/4881 711/150 |
| 2007/0240126 A1* | 10/2007 | Allen | 717/130 |
| 2007/0294668 A1* | 12/2007 | Mohindra et al. | 717/120 |
| 2011/0179252 A1* | 7/2011 | Master | G06F 9/505 712/30 |

OTHER PUBLICATIONS

Seshadri, Arvind, et al., Pioneer: Verifying Code Integrity and Enforcing Untampered Code Execution on Legacy Systems, ACM, 2005, pp. 1-16.

Zhang, Xiaolan, et al., System Support for Automatic Profiling and Optimization, ACM, 1997, pp. 15-26.

* cited by examiner

SYSTEM AND METHOD FOR MANAGING CODE DISPLACEMENT

BACKGROUND OF THE INVENTION

The present invention relates to managing code in a software application or the like, and more particularly to a system and method for managing code displacement or temporary deactivation on a predetermined basis to improve operation of an application, server or system.

When web based applications begin to have performance issues, such as overloading, excessive traffic or similar performance issues, there are only a few alternatives available for managing the performance of the application. In one alternative, a server or a server component may determine where and how many instances of the application may be running. This may prevent several clients from being able to utilize the application that need to. Another alternative may be Edge-Computing as provided by Akamai of Cambridge, Mass. EdgeComputing is a trademark or service mark of Akamai in the United States, foreign countries or both. With EdgeComputing, applications may be moved out into what is referred to as the edge and into larger distributed environments. Each of these alternatives are coarse grained and operate by managing the entire application as opposed to a more fine grained management, such as managing at the component level within the application.

Another option is to package the different parts of an application separately and to permit management of the different parts through one of the solutions discussed above. However, this increases the number of deployment units for an application. Such an arrangement may be manageable for an application with a minimum number of components, but for hundreds of components or modules this arrangement can make the deployment of an application very unmanageable.

BRIEF SUMMARY OF THE INVENTION

In accordance with an embodiment of the present invention, a system for managing code displacement may include a manager and an application operable on a server. The application may include a plurality of modules. Each module may perform a different operation. The system may also include priority information associated with each module to permit the manager to deactivate one or more selected modules based on the priority information to improve performance of the application.

In accordance with another embodiment of the present invention, a method for managing code displacement may include monitoring a load on an application, wherein the application may include a plurality of modules. The method may also include deactivating a selected number of modules based on a predetermined basis associated with each module in response to the load on the application exceeding a predetermined threshold.

In accordance with another embodiment of the present invention, a computer program product for managing code displacement may include a computer usable medium having computer usable program code embodied therein. The computer usable medium may include computer usable program code configured to monitor a load on an application, wherein the application includes a plurality of modules. The computer useable medium may also include computer usable program code configured to deactivate a selected number of modules based on a predetermined basis associated with each module in response to the load on the application exceeding a predetermined threshold.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, such as for example medium 126 in FIG. 1, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
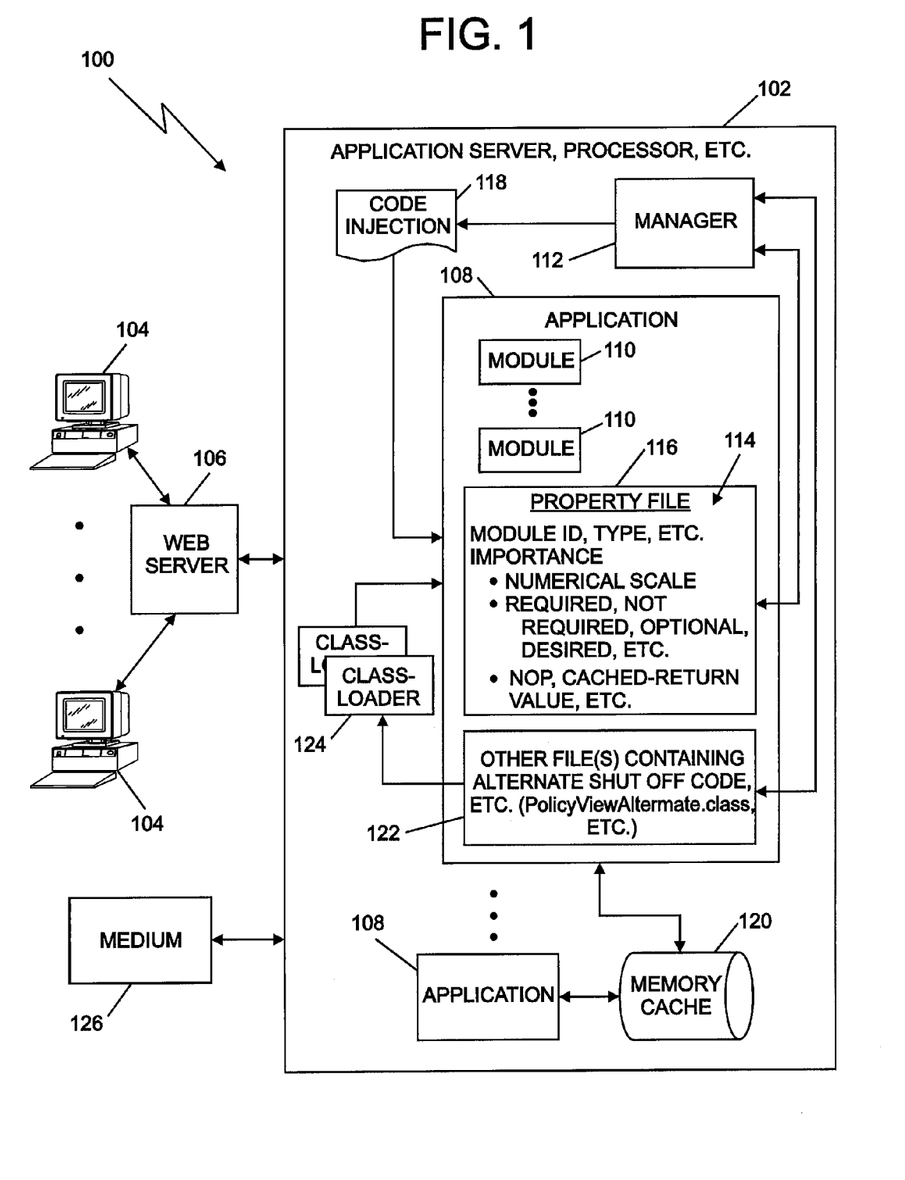
FIG. 1 is a block diagram of an example of a system for managing code displacement or temporary deactivation in accordance with an embodiment of the present invention.

FIG. 1 is a block diagram of an example of a system 100 for managing code displacement or temporary deactivation of selected modules in accordance with an embodiment of the present invention. The system 100 may include an application server 102, processor or the like. The application server 102 may be an IBM WebSphere Application Server (WAS) or other type application server. IBM and WebSphere are trademarks of International Business Machines in the United States, foreign countries, or both. The application server 102 may be accessed by a plurality of clients 104 via a web server 106 or similar internet gateway.

One or more applications 108 may be operable on the server 102. Each application 108 may have a specific purpose, such as facilitating stock transactions, providing stock quotes, providing financial services, e-commerce or other services. Each application may include a plurality of modules 110 or similar units. Each module 108 may perform a particular function within the application 108. A module may be set of software instructions, data structure, code or the like that perform the particular function or operation and may return a value or data to the application 108 or another module 110. Examples of different functions or operations that may be performed by individual modules in an application may include security, application logging at different levels, audit logging, presenting data, controlling operation of servlets, policy view and updating and other functions or operations depending upon the particular application. A stock transaction application, for example, may also include acquiring and presenting stock quotes and conducting stock transactions.

A manager 112 may be operable on the server 102 or may be associated with the server 102. The manager 111 may be adapted to permit managing code displacement by disabling or caching lesser priority, non-critical modules or module functionality. Priority information 114 may be associated with each module 110. The manager 111 may deactivate or disable selected ones of the modules 110 based on the priority information 111 associated with each module 110 to improve performance of the application 108 or server 102. The priority information 111 may include a level of desirability for the associated module 110 to execute based on an importance of the associated module 110 to the application 108.

A property file 116 may include the priority information and other information associated with each module 110. For example, the property file 116 may include an identity of each module 110, an importance associated with each module 110, a type of replacement associated with each module 110 or similar information or data. The type of replacement associated with each module 110 may include one of a no operation (NOP) type function, a cached return value function or other type of replacement to be returned in response to a deactivated module being called and wherein the particular type of replacement is associated with the deactivated module 110.

One example of a property file 116 may be to identify each module 110 by a module name or description and to provide a measure of importance associated with the module 110. In the following example, the importance may be measured from 0 to 100 with 0 being unimportant and 100 being most important to the operation of the application 108.

Security: 100
Application Logging Level 1: 50
Application Logging Level 2: 30
Application Logging Level 3: 10
Audit Logging: 100
Presentation (JSP): 100
Controller (servlets): 100
EJBs
Policy View: 10
Policy Update: 60
Claim Insert: 100
Claim View: 80
Claim Update: 100
Pay Claim: 100
Stock Quote: 10
Stock Transaction: 100

In this example, application server 102 may begin running the application 108 in its entirety. As the load starts to increase on the application 108, a code injection 118 may be injected to disable or deactivate a selected module 110 or selected modules 110 in response to a load on the application 102 exceeding a predetermined threshold. The modules 110 may be disabled or deactivated in an order according their respective measure of importance. Accordingly, when the load initially exceeds the predetermined threshold, lower level importance modules 110 may be deactivated and as the load increases, higher level of importance modules 110 may be deactivated. In the example above, Application Logging level 3 may be shut off, disabled or deactivated first. The Stock Quote module may be deactivated next if the load increases and so forth.

In another example of the property file 116, importance may be expressed as a level of desirability for the module to run as part of the application 108:

Security: required
Application Logging Level 1: desired & NOP
Application Logging Level 2: optional & NOP
Application Logging Level 3: not required & NOP
Audit Logging: required
Presentation (JSP): required
Controller (servlets): required
EJBs
Policy View: optional & Cached-Return-Value
Policy Update: desired & NOP
Claim Insert: required & Cached-Return-Value
Claim View: desired & Cached-Return-Value
Claim Update: required
Pay Claim: required
Stock Quote: optional & Cached-Return-Value
Stock Transaction: required
Java
PolicyView.class: desired & Cached-Return-Value
StockQuote.class: desired & Cached-Return-Value
StockTransaction.class: required
DetailedAnalysisModule.class: desired & Cached-Return-Value In this example, the level of importance to the operation of the application 108 may be expressed as "required" for operation of the application 108, "desired" for operation, "optional" for operation or "not required" for operation of the application 108. Also defined may be the type of replacement or return value in the event a deactivated module 110 is called during operation of the application 108. For example, if the load exceeds the predetermined threshold, the level 3 logging could be shut off first with an NOP operation or no value or data being returned. If the load continues to increase on the application 108, the stock quote module could be deactivated. However, the stock quote could have its cached return value returned instead of a NOP replacement. The cached return value may be stored in a memory cache 120. While the cached value may be somewhat stale or outdated, this cached value may be better than the NOP replacement.

The code injected 118 to shut off or disable a module 110 could also be "data not available due to load" or similar statement as the return value or type of replacement for a stock quote or other module where return of some notification or information to a user may be desirable.

The previous example, where the level of importance is expressed as a measure of importance from 0 to 100 may also include a value or type of replacement to be returned in the event the deactivated module is called or accessed during operation of the application 108, similar to the example just described. Additionally, while the measure of importance in this example was expressed as 0-100 any quantification of the measure or level of importance may be used.

As previously discussed, the code injection 118 may be injected to disable, deactivate or shut off a selected module 110 or selected modules 110 in response to the load on the application 108 or server 102 exceeding a predetermined threshold. When certain load thresholds are met, code in the application 108 or selected module 110 may be disabled based on its level of importance or desirability. The code may be deactivated or disabled by having the relevant code (NOP, Cache Return Value or alternate code) injected to temporarily disable the module's function.

The code injection 118 or injected code may be removed to reactivate the selected module or modules in response to the load falling back below the predetermined threshold or below another preset threshold that may be different from the predetermined threshold as described herein. The deactivated modules 110 may be reactivated in an order corresponding to their respective importance or desirability. Accordingly, those deactivated modules 110 having a higher level of importance or desirability may be reactivated prior to those with a lower level of importance or desirability as the load or traffic gradually decreases.

In accordance with another embodiment of the present invention, the application server 102 may include the property file 116 and any additional sets of files 112 that may include an "alternative shut off code" for a selected module 110 or selected modules. In this embodiment, when certain load thresholds are met, code or a module 110 may be disabled, based on the code or module's level of importance, by having the alternative code injected. The alternate code may replace the original class or code to temporarily disable the code or module's function. Code can either be provided by the application 108, such as alternative code modules, or NOP versions generated by the application server 102 that dummy out methods within the application 108. This can be achieved through one of multiple embodiments. One embodiment may involve a classloader 114 reloading the original class with the alternate class. Another embodiment may include a substitution of the classloader 114. Multiple classloaders 124 may all hold different modules 110 disabled. As disability is required the application 108 may point to different classloaders 114 that have the desired level of code capability. Classloaders 114 could be saved to a disk or other medium 126 in order to save memory.

When the load thresholds fall back down the injected code may be removed and the original implementation may be allowed to process. This method could also be handled by loading the alternate class or code, reworking the class's or code's name or identity to take over the original implementation when load or traffic levels exceed the predetermined threshold, and then unloading the alternate class or code and reloading the original code when the load or traffic falls below the predetermined threshold or other preset threshold.

Figure 2:
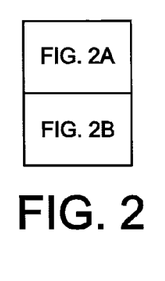
FIG. 2 is a flow chart of an example of a method for managing code displacement or temporary deactivation in accordance with an embodiment of the present invention.
Figure 2A:
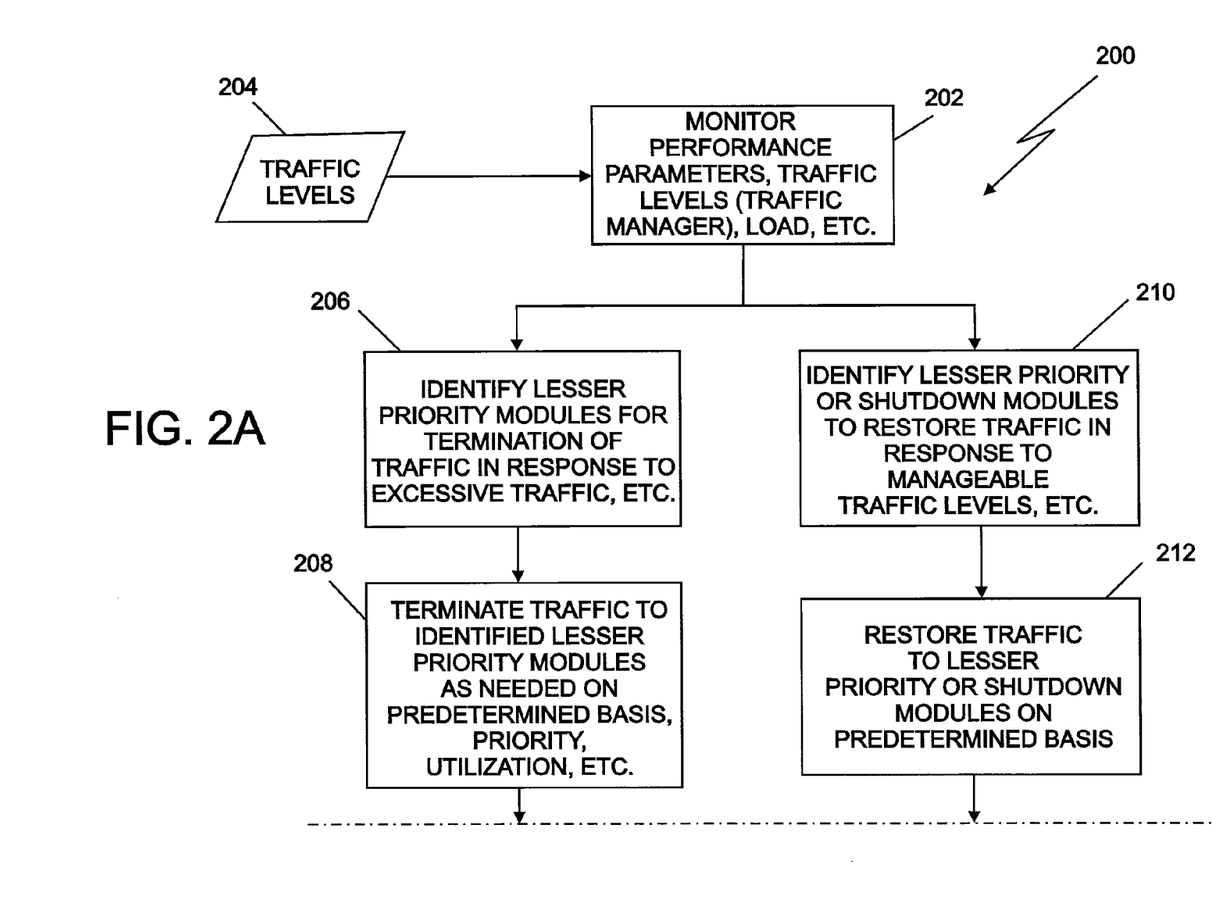
Figure 2B:
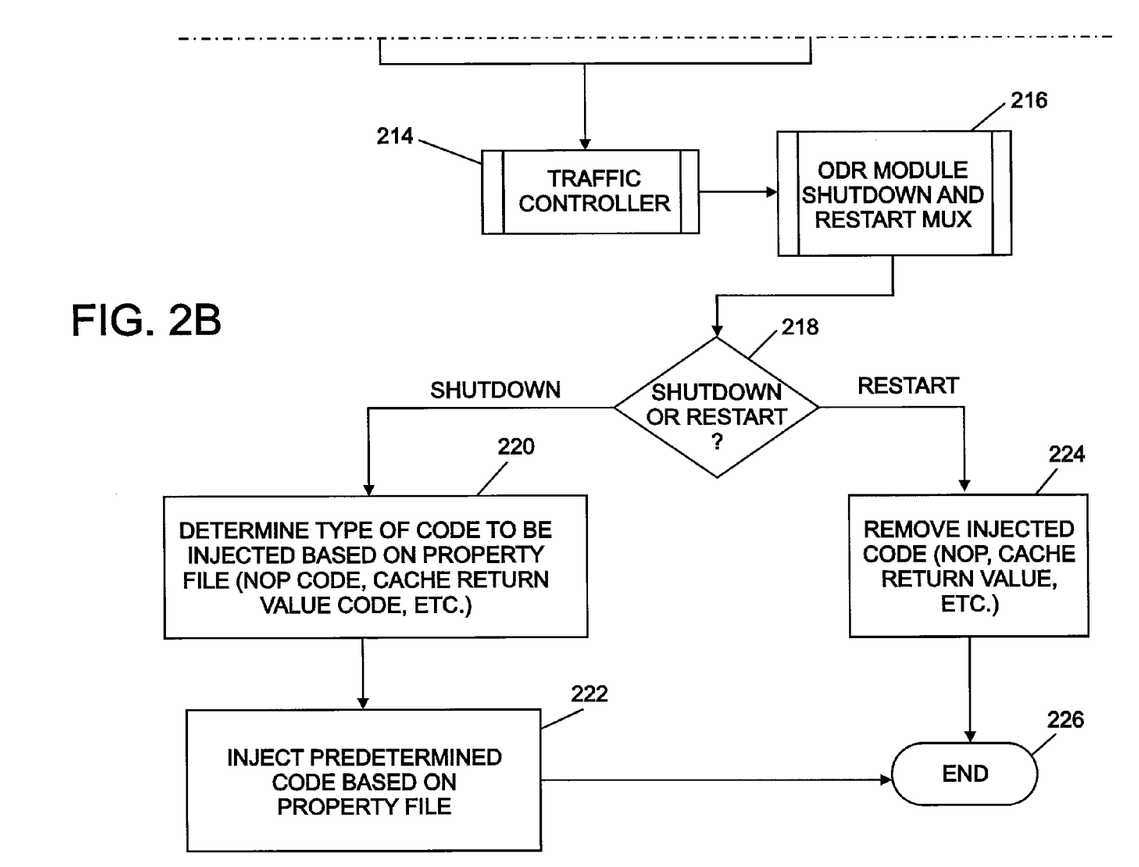

FIG. 2 is a flow chart of an example of a method 200 for managing code displacement or temporary deactivation in accordance with an embodiment of the present invention. The method 200 may be embodied in the system 100 of FIG. 1. In block 202, performance parameters or the like, such as traffic levels 204 or other measures of performance may be monitored. In block 206, lesser priority modules may be identified for termination of traffic in response to excessive traffic to an application or application server, similar to application 108 or server 102 of FIG. 1. In block 208, traffic may be terminated to identified lesser priority modules as needed on a predetermined basis. The predetermined basis may include a priority of the module to operate, utilization or demand for use of the module, desirability of the module to be operating or other basis as may be appropriate for the particular application.

In block 210 lesser priority or shutdown modules may be identified to restore traffic in response to manageable traffic levels or similar operational parameters being determined by the system or method. In block 212, traffic may be restored to the lesser priority or shutdown modules on a predetermined basis that may be similar to the basis utilized in terminating traffic. Accordingly, traffic may be restored to selected modules according to their level of priority, desirability, utilization or other measure or criteria. Blocks 206 and 208 may operate in parallel with blocks 210 and 212.

Any results from block 208 or block 212 may be sent to a traffic controller 214. The traffic controller 214 may signal an On Demand Router (ODR) module shutdown and restart multiplexer (MUX) 216 to shutdown or restart modules as further described herein.

In block 218 a determination may be made whether the command or signal from the ODR shutdown and restart MUX 216 is a shutdown or restart command or signal. If a shutdown signal, the method 200 may advance to block 220. In block 220, a determination may be made as to the type of code to be injected. The type of code may be based on a property file similar to that previously described. The type of code may be an NOP code, a cache-return-value type code or alternative shut-off code or other type code. In block 222, the predetermined code based on the property file may be injected into the application or module to be deactivated.

If the command or signal in block 218 is a restart command, the method 200 may advance to block 224. In block 224, the injected code may be removed and the module or code may return to its normal or original operation. The method 200 may end at termination 226.

Figure 3:
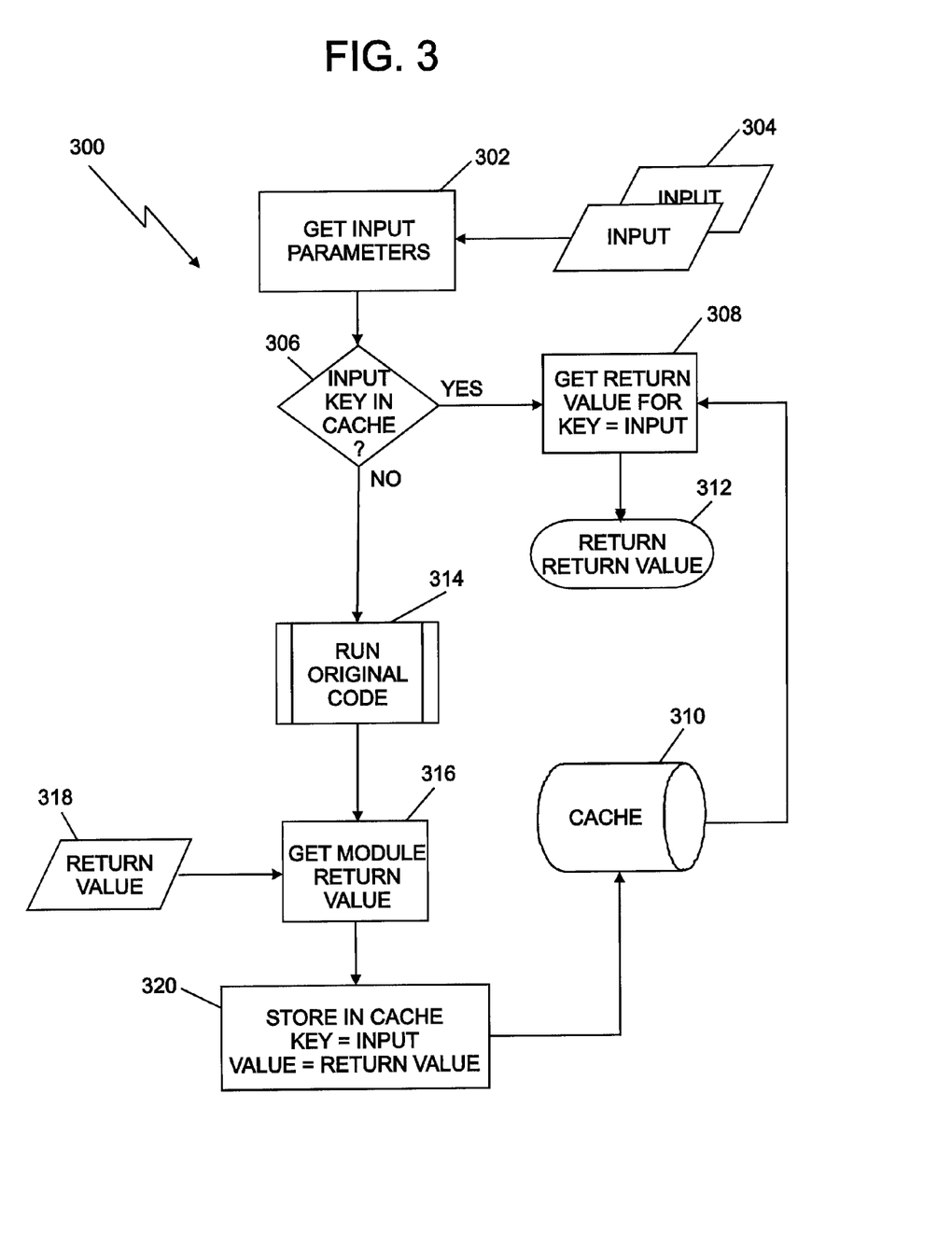
FIG. 3 is flow chart of an example of a method for managing a cache return value in accordance with an embodiment of the present invention.

FIG. 3 is flow chart of an example of a method 300 for managing a cache return value in accordance with an embodiment of the present invention. As previously discussed, the cache return value may be sent in response to a deactivated module in an application being called or accessed during operation of the application. The method 300 may be embodied in the system 100 of FIG. 1 or a similar system. In block 302, input parameters 304 may be obtained. The input parameters 304 may control deactivation and responses from a particular module as outlined in a property file, similar to property file 116, associated with the particular module.

In block 306, a determination may be made if there is an input key in the cache. If there is an input key in the cache, the method 300 may advance to block 308. In block 308, the cached return value may be obtained from a cache 310 corresponding to the key being equal the input. The return value 318 may be returned in block 312 and the method 300 may end.

If there is no input key in the cache in block 306, the method 300 may advance to block 314. In block 314, the original code may be run. In block 316, a module return value 318 may be acquired. In block 320, the return value 318 may be stored in cache 310. The return value may be stored in the cache 310 in association with a key set equal to an input 304 or input parameter and an associated value set equal to a return value 318.

Figures 4, 4A:
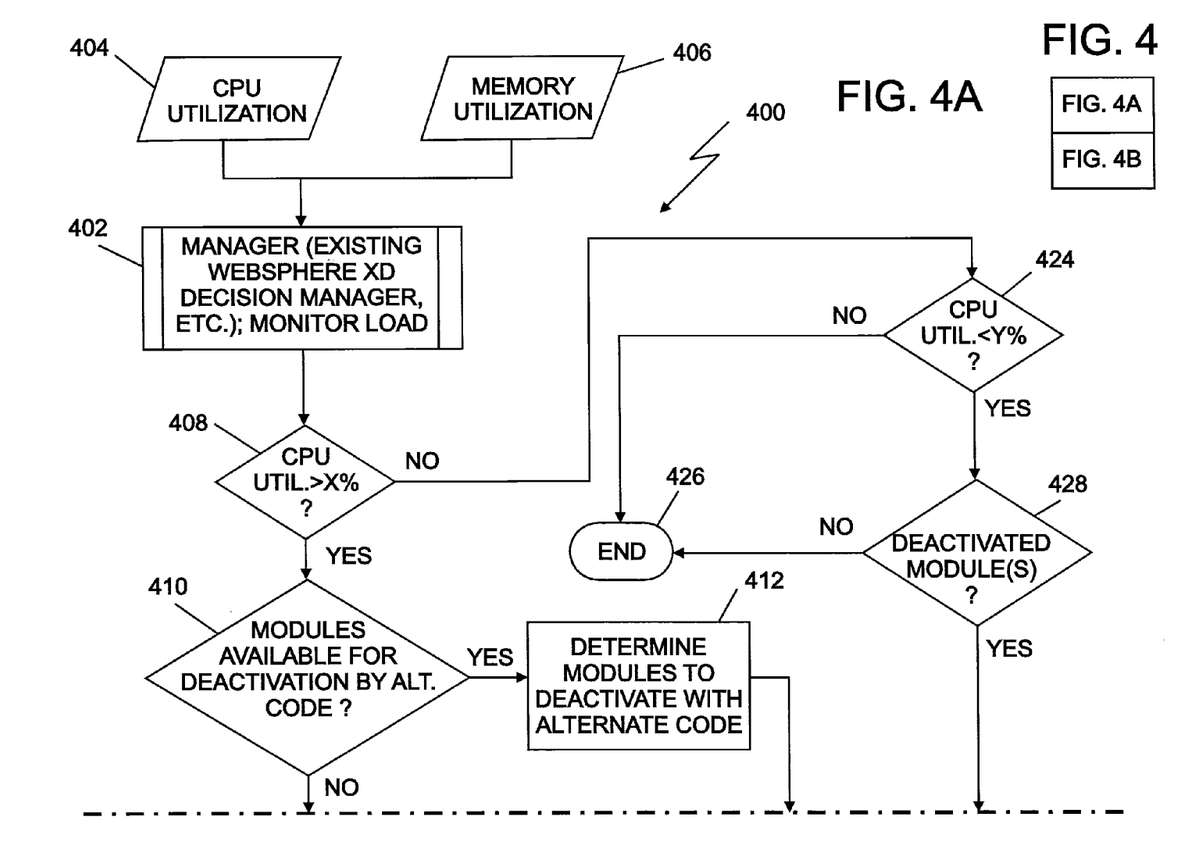
FIG. 4 is a flow chart of an example of a method for managing code displacement or temporary deactivation in accordance with another embodiment of the present invention.
Figure 4B:
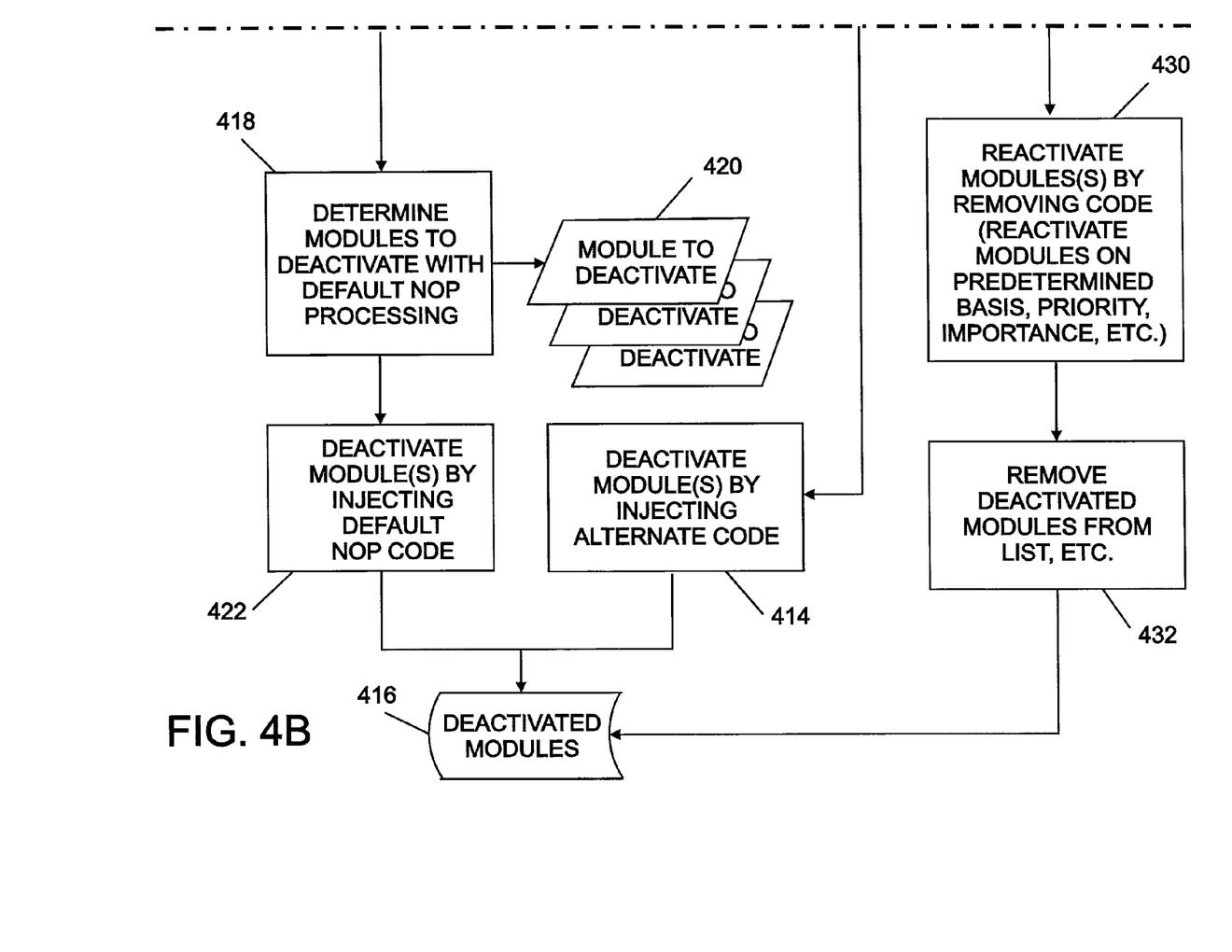

FIG. 4 is a flow chart of an example of a method 400 for managing code displacement or temporary deactivation in accordance with another embodiment of the present invention. The method 400 may be embodied in the system 100 of FIG. 1 or a similar system. A manager 402 may monitor a load on an application or server. The manager 402 may monitor a central processing unit (CPU) 404 and/or a memory utilization 406. The manager 402 may be an existing Websphere XD decision manager of a WebSphere Application Server or similar manager of another type application server.

In block 408, a determination may be made if the CPU utilization 404 or memory utilization 406 or both exceed a predetermined threshold or respective predetermined thresholds. If the predetermined threshold, both thresholds, or either respective threshold is exceeded, as the case may be, the method 400 may advance to block 410. In block 410, a determination may be made whether there are any modules available that are capable of being deactivated by alternate code. If a module is available, the method 400 may advance to block 412. In block 412, modules capable of being deactivated with alternate code may be determined or identified. In block 414, the identified module or modules may be deactivated by injecting the alternate code. The deactivated module or modules may be added to a deactivated module list 416.

If no modules are available that are capable of being deactivated by alternate code in block 410, the method 400 may advance to block 418. In block 418, any modules 420 that are capable of being deactivated with default NOP processing or by injecting a default NOP code or the like may be determined. In block 422, a selected module or modules may be deactivated by injecting the default NOP code or by a similar technique like that previously described. Any deactivated modules may be added to the deactivated module list 416.

If the CPU utilization 404, memory utilization 406, or both does not exceed a respective, predetermined level in block 408, the method 400 may advance to block 424. In block 424, a determination may be made whether the CPU utilization 404, memory utilization 406, or both are less than a preset limit or threshold. If the utilization is not less than the preset limit, the method 400 may end at termination 426. If the utilization is less than the preset limit in block 424, the method 400 may advance to block 428.

In block 428, a determination may be made if there are any deactivated modules. If there are no deactivated modules in block 428, the method may end at termination 426. If there are deactivated modules, the method 400 may advance to block 430. In block 430, a module or modules may be reactivated by removing any code used to deactivate the module. The module or modules may be reactivated in an order according to a predetermined basis, such as priority of the module, importance, desirability or similar criteria. In block 432 any reactivated module or modules may be removed from the deactivated modules list 416.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for managing code displacement, comprising:
an application server;
a manager operable on the application server;
an application operable on the application server, wherein the application includes a plurality of modules each to perform a different operation and wherein the manager monitors a load or traffic level on the application; and
priority information associated with each module to permit the manager to deactivate selected ones of the modules based on the priority information to improve performance of the application in response to the load or traffic level exceeding a predetermined threshold, wherein the manager is configured to determine which modules of the plurality modules are available for deactivation by injecting an alternate code in response to the load or traffic level exceeding the predetermined threshold and to determine which modules of the plurality of modules to deactivate by injecting a default no operation (NOP) code in response to none of the modules of the plurality of modules being available for deactivation by injecting the alternate code.

2. The system of claim 1, further comprising a type of replacement associated with each module.

3. The system of claim 2, wherein the type of replacement comprises one of a no operation (NOP) type function and a cached return value function to be returned in response to a deactivated module being called and wherein this type of replacement is associated with the deactivated module.

4. The system of claim 1, wherein the priority information comprises a level of desirability for the associated module to execute based on an importance of the associated module to the application.

5. The system of claim 4, further comprising a property file including an identity of each module, the importance associated with each module, and a type of replacement associated with each module.

6. The system of claim 1, further comprising a code injection to be injected to disable a selected module in response to a load or traffic level on the application exceeding the predetermined threshold, and wherein the code injection is removed to reactivate the selected module in response to the load or traffic level falling below the predetermined threshold.

7. The system of claim 1, wherein the manager comprises a data structure to inject and remove the code injection from the selected module.

8. A method for managing code displacement, comprising:
monitoring a load or traffic level on a software application operating on a server, wherein the software application includes a plurality of modules;
determining which modules of the plurality of modules are available for deactivation by injecting an alternate code in response to the load or traffic level on the application exceeding a predetermined threshold;
determining which modules of the plurality of modules to deactivate by injecting a default no operation (NOP) code in response to none of the modules of the plurality of modules being available for deactivation by injecting the alternate code; and
deactivating a selected number of modules based on a predetermined basis associated with each module in response to the load or traffic level on the application exceeding the predetermined threshold.

9. The method of claim 8, further comprising reactivating a chosen number of modules based on the predetermined basis in response to the load or traffic level falling below a preset threshold.

10. The method of claim 9, wherein the predetermined basis comprises at least one of a priority of operation of the module, a level of importance of the module to the application, and a desirability of execution of the module during operation of the application.

11. The method of claim 8, further comprising determining a type of replacement associated with each module to be returned in response to a deactivated module being called.

12. The method of claim 8, further comprising returning one of a group of types of replacements including a no operation (NOP) type function and a cached return value function, in response to a deactivated module being called and one of these types of replacements being associated with the deactivated module.

13. The method of claim 8, further comprising:
injecting a code injection to deactivate each module; and
removing the code injection to reactivate each module in response to the load or traffic level falling below a preset threshold.

14. The method of claim 8, further comprising determining a type of code to be injected to deactivate a particular module.

15. The method of claim 14, wherein determining the type of code comprises determining one of a group comprising an NOP code, a cache return value code and an alternate code.

16. A computer program product for managing code displacement, the computer program product comprising:
a computer usable storage medium having computer usable program code embodied therein, the computer usable medium comprising:
computer usable program code configured to monitor a load or traffic level on a software application, wherein the application includes a plurality of modules;
computer usable program code configured to determine which modules of the plurality of modules are available for deactivation by injecting an alternate code in response to the load or traffic level on the application exceeding a predetermined threshold;
computer usable program code configured to determine which modules of the plurality of modules to deactivate by injecting a default no operation (NOP) code in response to none of the modules of the plurality of modules being available for deactivation by injecting the alternate code; and
computer usable program code configured to deactivate a selected number of modules based on a predetermined basis associated with each module in response to the load or traffic level on the application exceeding the predetermined threshold.

17. The computer program product of claim 16, wherein the computer usable medium further comprises computer usable program code configured to reactivate a chosen number of modules based on the predetermined basis in response to the load or traffic level falling below a preset threshold.

18. The computer program product of claim 16, wherein the computer usable medium further comprises computer usable program code configured to determine a type of replacement associated with each module to be returned in response to a deactivated module being called.

19. The computer program product of claim 16, wherein the computer usable medium further comprises:
  computer usable program code configured to inject a code injection to deactivate each module; and
  computer usable program code configured to remove the code injection to reactivate each module in response to the load or traffic level falling below a preset threshold.

20. The computer program product of claim 16, wherein the computer usable medium further comprises computer usable program code configured to determine a type of code to be injected to deactivate a particular module.

21. The method of claim 8, further comprising adding an identity of each deactivated module to a list of deactivated modules.

22. The method of claim 8, further comprising:
  providing the alternate code by the software application; and
  generating the default NOP code by the server.

23. The method of claim 22, wherein providing the alternate code by the software application comprises reloading original code with the alternate code by a one classloader of multiple classloaders, wherein the software application points to the one classloader that has the desired alternate code.

* * * * *